Aug. 2, 1955 H. F. HEISLER 2,714,436
POWER TAKE OFF
Filed April 10, 1950 3 Sheets-Sheet 1
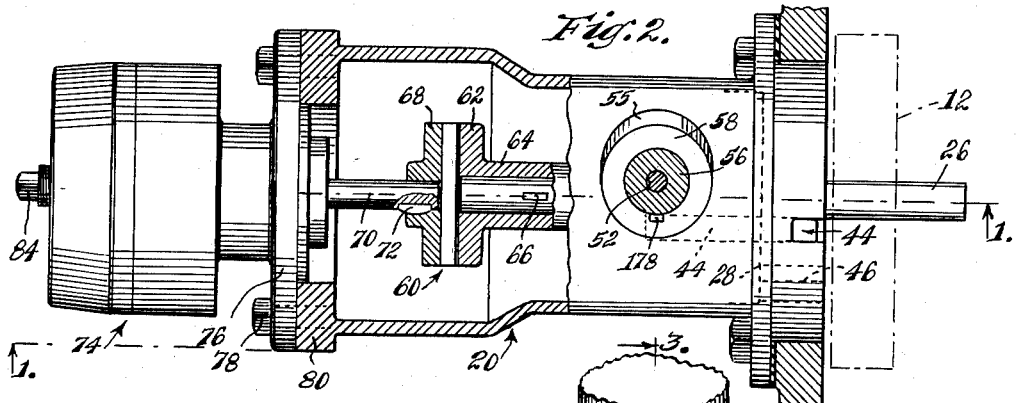
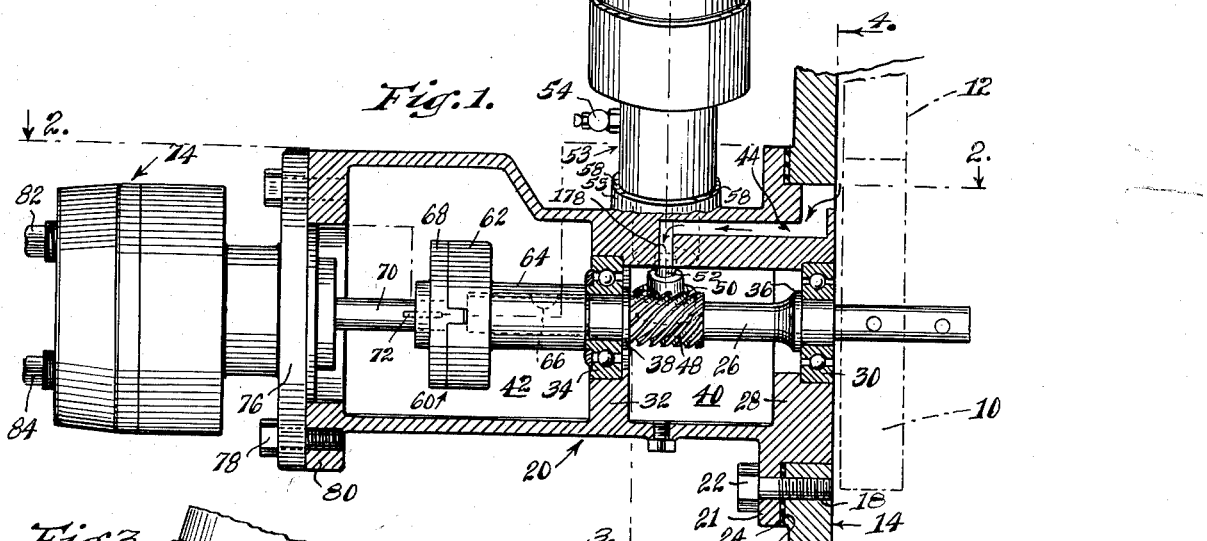
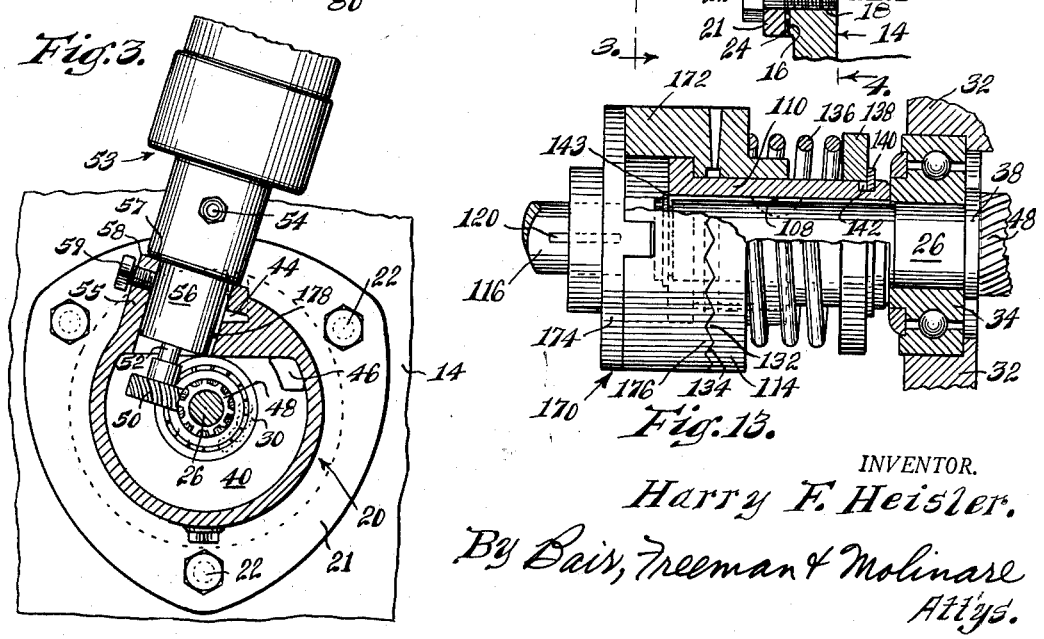
INVENTOR.
Harry F. Heisler.
By Bair, Freeman & Molinare
Attys.

Aug. 2, 1955
H. F. HEISLER
2,714,436
POWER TAKE OFF
Filed April 10, 1950
3 Sheets-Sheet 2
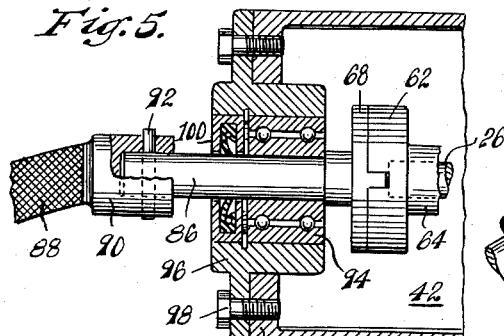
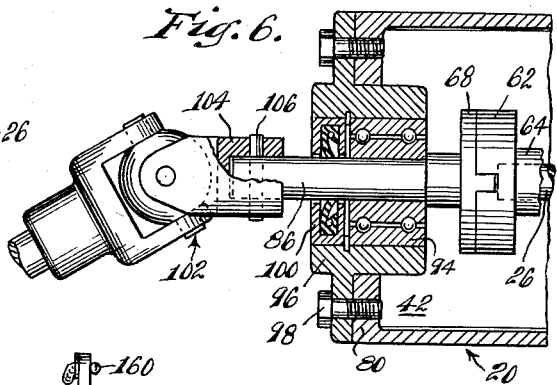
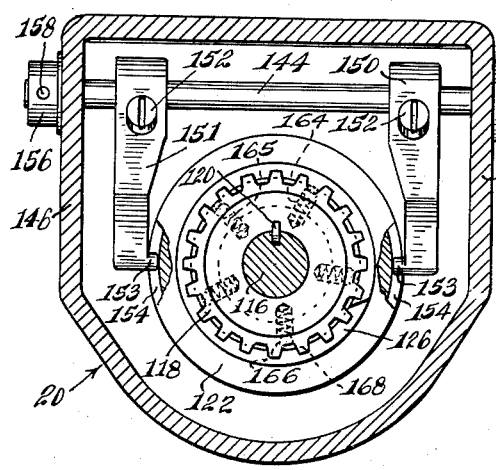
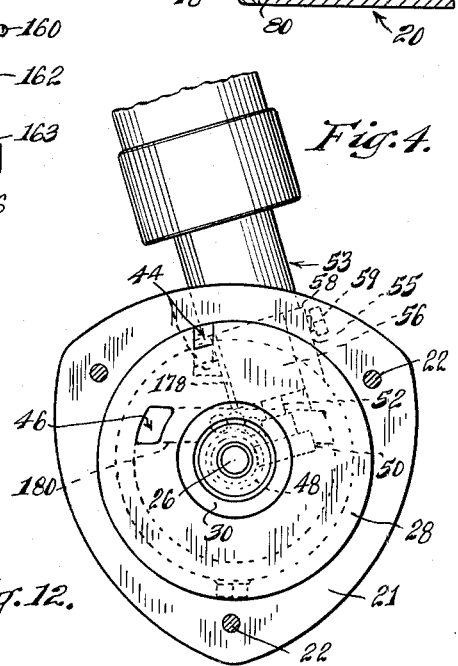
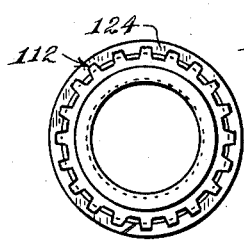
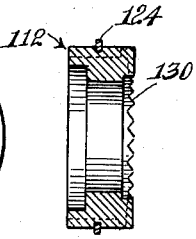
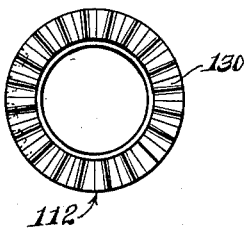
INVENTOR.
Harry F. Heisler.
By Bair, Freeman & Molinare
Att'ys.

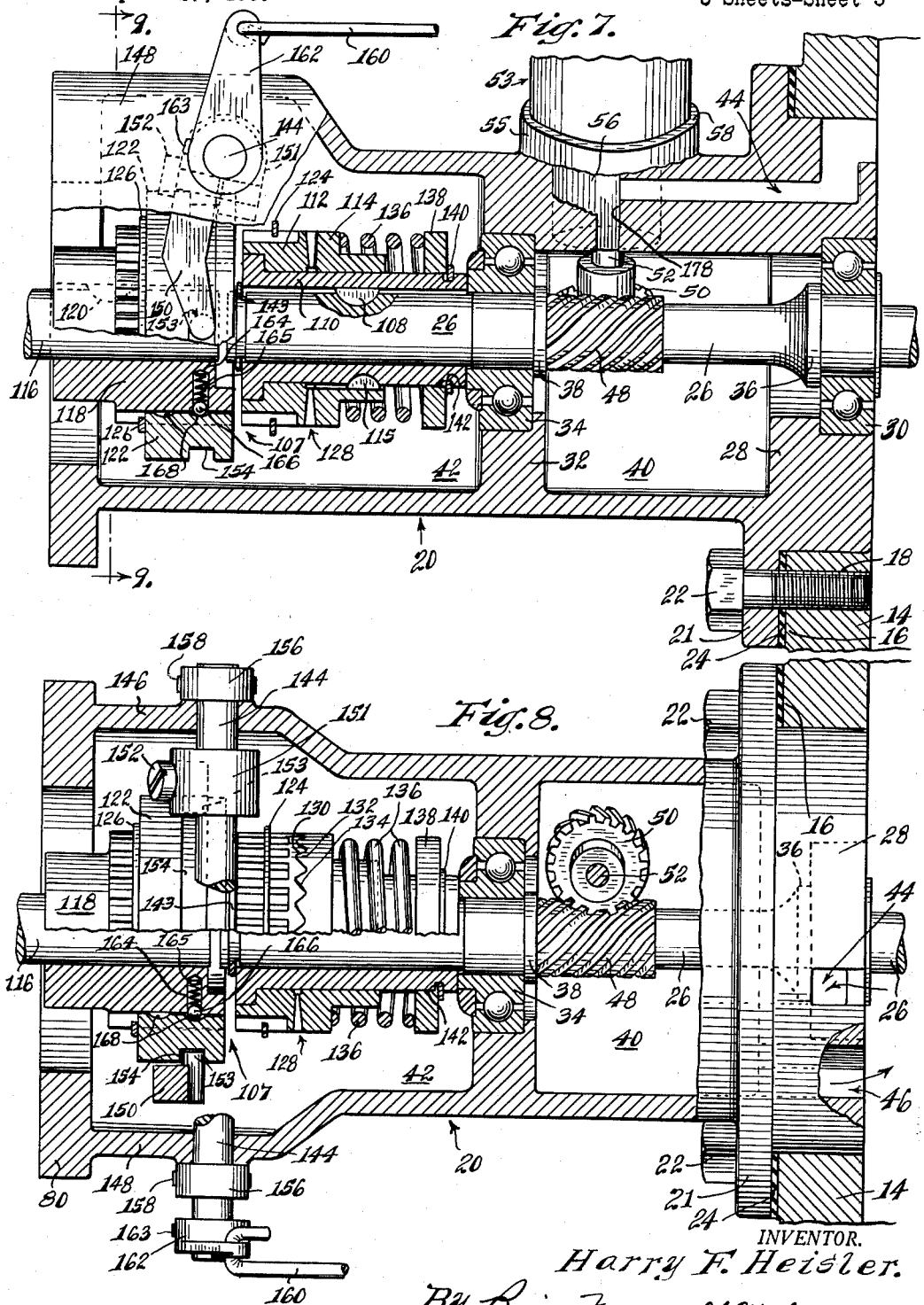

United States Patent Office 2,714,436
Patented Aug. 2, 1955

2,714,436

POWER TAKE OFF

Harry F. Heisler, Hudson, Iowa

Application April 10, 1950, Serial No. 155,106

4 Claims. (Cl. 192—48)

This invention relates to a power take off and more particularly to a power take off which is connected to the magneto shaft of an engine for tractors and the like.

In an ordinary tractor engine and transmission, there may be three points at which power can be taken off. The primary power take off is the drive shaft which is used to drive the tractor's wheels. Two secondary power take offs are located at the ends of the countershaft in the transmission. The countershaft is rotatably driven from the engine. Usually one of these secondary take offs is connected to the auxiliary tractor equipment and the other take off is connected to a hydraulic pump for the tractor's hydraulic system.

It is often desirable to have an additional power take off available for operating small equipment. Usually this small equipment cannot be connected to the primary or secondary take offs since these are often permanently connected for their respective operations. To make an additional connection to any of these power take offs is a costly and complicated operation. Furthermore, when the tractor is stationary, the drive shaft is not rotating and there may even be occasions when the countershaft is not being rotated (for example see my copending application on an Overdrive System, Serial No. 150,852, filed March 20, 1950, now Patent No. 2,689,031, patented September 14, 1954). An additional power take off connected to any of the primary or secondary take offs would necessitate the actuation of one or more of the existing power take offs regardless of whether or not such power was desired or needed at that time. Such an operation would be very wasteful of power.

Thus, one of the objects of this invention is to provide a novel power take off from an engine, which power take off is driven through the timing gear.

Another object of this invention is to provide a power take off from an engine, which power take off is independent of any existing power take off of the drive shaft and the countershaft.

A further object of this invention is to provide a power take off from an engine, which power take off is operable even when both the drive shaft and countershaft are not being rotated.

A still further object of this invention is to provide a power take off having a manually operable clutch to permit engaging and disengaging of coupling means, between the drive and the load, and a slipping overload coupling for automatic disengaging upon excessive loading thereof.

Still another object of this invention is to provide a magneto or distributor driving means mounted in a housing outside the engine housing and to provide a novel means for lubricating said magneto or distributor driving means.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawing, in which—

Figure 1 is a side elevational view, partly in cross section, of one form of the auxiliary power take off showing in dot and dash view the timing gears which drive the power take off, the driven shaft of said power take off being shown connected to a hydraulic pump.

Figure 2 is a top plan view partly in cross section of the auxiliary power take off shown in Figure 1 and is taken substantially on line 2—2 of Figure 1.

Figure 3 is a view, partially in cross section, and is taken substantially on line 3—3 of Figure 1.

Figure 4 is an end view of the auxiliary power take off housing and is taken from the right of the housing as seen in Figure 1.

Figure 5 is a cross sectional view of a modification of the driving connection, the driven shaft of the power take off actuating a flexible shaft.

Figure 6 is a cross sectional view of another modification of the driving connection, the driven shaft of the power take off actuating another shaft through a universal joint.

Figure 7 is a cross sectional view, similar to Figure 1, of a modified form of the auxiliary power take off, which modified form includes a manually shiftable clutch and an automatic slipping overload coupling between the drive shaft and driven shaft of the power take off.

Figure 8 is a top plan view partially in elevation and partially in cross section of the modification shown in Figure 7.

Figure 9 is another view of the modified form shown in Figures 7 and 8 and is taken on line 9—9 of Figure 7.

Figure 10 is a view of one end of a rotatable coupling member used in the modified form shown in Figures 7–9, said end of the member being adapted for use with the shiftable clutch.

Figure 11 is a cross sectional view of the member shown in Figure 10.

Figure 12 is an end view of the other end of the rotatable coupling member shown in Figures 10 and 11, which end is adapted for use with the slipping overload coupling.

Figure 13 is an enlarged view of the coupling members showing another combination of coupling members including the coupling shown in Figure 1 and the slipping overload coupling shown in Figure 7.

For the purposes of describing this invention it is first necessary to note certain portions of the drive system of a typical tractor.

The ignition system of tractors usually comprises a magneto, or a distributor, or a magneto in combination with a distributor. Both the magneto and distributor-magneto systems are enclosed within a housing, which housing is mounted on the engine housing. Both the magneto and distributor or the distributor-magneto system are driven by a common shaft, hereinafter referred to as a magneto shaft. One end of the magneto shaft extends into the engine housing and has a timing gear mounted thereon.

The timing gear is in mesh with a timing drive gear, which timing drive gear is usually mounted on a cam shaft, or other rotating member driven directly from the crank shaft.

Referring now to Figure 1, there is shown a timing gear 10, in mesh with a timing drive gear 12, and mounted within an engine housing generally indicated at 14. The engine housing 14 is provided with a mounting face 16 upon which the magneto housing was mounted. Tapped holes 18 are provided for receiving mounting bolts.

For the purposes of this invention the magneto housing, the magneto, the distributor, and the magneto drive shaft are removed. A housing, generally indicated at 20 and having a mounting flange 21, is then mounted on the mounting face 16 by means of bolts 22, a gasket 24 being provided to seal the joint between flange 21 and face 16.

A shaft 26, replacing the magneto drive shaft, is mounted within the housing and extends into the engine housing 14. The end of shaft 26 extending into the engine housing 14 has affixed thereto the timing gear 10.

A first transverse wall 28 is provided in housing 20, which wall 28 has a bearing 30 mounted therein adapted to journal shaft 26. A second transverse wall 32, provided in housing 20, also has a bearing 34 mounted therein adapted to journal shaft 26.

The shaft 26 is provided with shoulders 36 and 38 adapted to cooperate respectively with bearings 30 and 34 to restrict shaft 26 from any axial movement within the housing 20.

The second transverse wall 32 effectively divides the housing 20 into two chambers, a magneto and distributor drive chamber 40 and a coupling chamber 42. A pair of passageways, generally indicated at 44 and 46, pass through first transverse wall 28 and connect chamber 40 to the interior of engine housing 14, whereby lubricant is supplied to chamber 40 in housing 20. The path of the lubricant into and out of chamber 40 will be described in greater detail hereinafter. Bearing 34 is provided with a grease seal 35 which effectively restricts the lubricant in chamber 40 to that chamber and prevents seepage into chamber 42.

Within the magneto and distributor drive chamber 40, and mounted on shaft 26 is a helical gear 48. The helical gear 48 drives a second helical gear 50, the latter being affixed to a magneto shaft 52, the axis of the magneto shaft 52 lying in a plane transverse to the axis of shaft 26. The magneto shaft 52 extends from an auxiliary housing, generally indicated at 53, and provided with a grease fitting 54, which auxiliary housing 53 is for a magneto or for a distributor, or for both. The auxiliary housing 53 is mounted upon the housing 20. Housing 20 is formed with a collar-like boss 55 adapted to receive therein a portion 56 of the auxiliary housing 53. The auxiliary housing is stepped as at 57 to butt against the face 58 of boss 55, whereby the auxiliary housing 53 is partially supported. A set screw 59 fixes auxiliary housing 53 in position within collar-like boss 55.

The shaft 26 extends part way into the coupling chamber 42 and has mounted thereon one jaw 62 of a coupling, generally indicated at 60. The jaw 62 has a sleeve 64 which is keyed to shaft 26 by means of key 66. The second jaw 68 of coupling 60 is keyed to a driven shaft 70 by means of key 72.

The shaft 70 is part of a hydraulic pump unit generally indicated at 74 which is mounted, by means of mounting plate 76 and bolts 78, upon flange 80 of housing 20. A pair of ports 82 and 84 for the supply and return of hydraulic fluid are also shown.

In the operation of the modification shown in Figures 1 to 4, the shaft 26 is continually driven by means of the set of timing gears 10 and 12. The timing gear 10 is mounted on shaft 26 and the timing drive gear 12 is driven by means of the engine, which means are not shown. The ignition device within housing 53 is continually driven by means of the pair of gears 48 and 50.

The drive shaft 26 is also coupled to a driven shaft, which drives a hydraulic pump unit generally indicated at 74. The coupling 60 is of the type that causes shaft 70 to be continually driven. Thus, the ignition device within housing 53 is continually driven by drive shaft 26; and the hydraulic pump 74 is continually driven through the connection of drive shaft 26 to driven shaft 70 by means of coupling 60.

The timing gear 10, which is immersed in lubricant, serves to throw lubricant into passageway 44 where it is carried into chamber 40 in a manner that will be described below.

The driven shaft can be used to actuate any rotatably operative means for transmitting power and hence two rotatably operative devices for transmitting power are shown in Figures 5 and 6, which are described in detail hereinafter.

A coupling is provided between the drive shaft and the driven shaft which permits optional engagement and disengagement thereof. Such a device is shown in Figures 7 to 9 and will be described in detail below. A coupling which will automatically become disengaged upon overload of the driven shaft is shown in Figures 7, 8 and 13, and will be described in detail hereinafter.

In the modification shown in Figure 5, the second jaw 68 of the coupling 60 is secured to a shaft 86 at one end. The other end of shaft 86 is connected to a flexible shaft 88 by means of a coupling collar 90, and a pin 92 passing through coupling collar 90 and shaft 86. The shaft 86 is journalled by means of bearings 94 in annular member 96 bolted to flange 80 of housing 20 by bolts 98. An annular grease seal 100 is positioned between shaft 86 and annular member 96 to seal the coupling chamber 42.

The modification shown in Figure 6 is similar to the modification shown in Figure 5 except that a universal coupling, generally indicated at 102 is used instead of a flexble shaft. The shaft 86 is connected to the universal coupling 102 by means of a coupling collar 104, and a pin 106 passing through coupling collar 104 and shaft 86.

The modified form of this invention shown in Figures 7 and 8 comprises modifications in the coupling connections located in coupling chamber 42. In this form, the simple jaw type coupling 60 which is always in engagement as shown in Figures 1 and 2, is replaced by a first coupling means or coupling, generally indicated at 107, which provides for optional engaging or disengaging.

The shaft 26 has keyed thereto by means of key 108 a sleeve member 110. Rotatably mounted on sleeve 110 is a coupling member 112 which is part of coupling 107. A torque-overload responsive means is provided which includes overload slipping coupling member 114 which is biased into engagement with coupling member 112. This overload coupling member 114 is keyed to sleeve 110 by key 115. When the overload coupling is in engagement, thereby forming a second coupling means, then the coupling members 112 and 114 rotate as a unit. For this immediate portion of the description the coupling members 112 and 114 will be assumed to be in engagement. The details of the overload slipping coupling will be described hereinafter.

A shaft 116 is keyed to the other coupling member 118 of the coupling 107 by means of key 120. The shaft 116 drives one of the forms of power transmission shown in Figures 1, 4, and 5. Both portions 112 and 118 of coupling 107 have the same external diameter and both are splined to receive a shiftable clutch collar 122. The clutch collar 122 is internally splined and mounted concentrically in mesh with coupling member 118. When the clutch collar 122 is shifted to the right in Figures 7 and 8, it engages rotating coupling member 112 and then shaft 116 is driven. When the clutch collar 122 is shifted to the left, which is the position shown in Figures 7 and 8, the coupling 107 is disengaged and shaft 26 rotates freely. A pair of snap rings 124 and 126 are provided for limiting the axial movement of shiftable clutch collar 122.

The overload slipping coupling generally indicated at 128 consists of coupling members 112 and 114. The abutting faces of members 112 and 114 are provided with teeth 130 and 132 respectively over a portion thereof to provide a slipping connection. The saw tooth joint between these members is indicated in Figure 8 at 134. Figure 12 shows the teeth 130 in the face of coupling member 112.

The overload slipping coupling member 114 is resiliently biased into engagement with coupling member 112 by means of spring 136. The spring 136 is a compression spring positioned between coupling member 114 and annular flange 138. The annular flange 138 is restrained from movement to the right in Figure 7 by snap ring 140 in groove 142 in sleeve 110. The sleeve 110 is prevented from movement in an axial direction upon drive shaft 26 by means of snap ring 143 and bearing 34, between which the sleeve 110 is positioned.

If the coupling 107 is engaged and shaft 116 is driving a load, the overload slipping coupling 128 acts to automatically disengage if the load is greater than that designed for. At all times the magneto and distributor, generally indicated at 53, are driven as shaft 26 continues to rotate. The load at which disengagement of the coupling 128 takes place is variable depending upon the force exerted by spring 136. For greater loads, a greater force must be exerted by spring 136 to prevent disengagement of coupling 128.

The means for shifting the clutch collar 122 comprises a rock shaft 144 journalled in opposite longitudinal walls 146 and 148 of housing 20. A pair of split arms 150 and 151 are clamped by means of bolts 152 on rock shaft 144. The arms 150 and 151 extend on opposite sides of clutch collar 122. The extended end of each arm 150 and 151 has a finger 153 formed therein. The fingers 153 oppositely face each other and are positioned within a circumferential groove 154 in clutch collar 122 at opposite ends of a diameter of said clutch collar. Rocking of shaft 144 results in swinging the fingers 153 through an arcuate path, whereby shifting of the clutch collar 122 is obtained.

A pair of collars 156, secured by set screws 158 to rock shaft 144 cooperate with walls 146 and 148 of housing 20 to prevent movement of the rock shaft 144 in its axial direction. The rock shaft 144 is actuated by means of a link 160 through a toggle arm 162 secured to rock shaft 144 by set screw 163. The link 160 is part of a suitable actuating linkage (not shown).

A ball poppet means for positioning the clutch collar 122 in predetermined positions axially with respect to shaft 116 is also provided. This ball poppet means is more fully described in my copending application on an Overdrive System, Serial No. 150,852, filed March 21, 1950, now Patent No. 2,689,031, patented September 14, 1954. The ball poppet means comprises a plurality of radial bores 164 in coupling member 118, and a plurality of compression springs 165 within the bores 164, a plurality of balls 166 mounted in bores 162 and biased outwardly therefrom by springs 168, and a plurality of arcuate grooves 168 in the splines of clutch collar 122 adapted to receive the resiliently biased balls 166, whereby resistance to axial movement of the clutch collar 122 is obtained. The plurality of arcuate grooves 168 are located in two planes, one corresponding to the coupling members 112 and 126 being engaged and the second corresponding to the coupling members being disengaged.

The operation of the modified form of this invention shown in Figures 7 and 8 is as follows. The drive shaft 26 is continually driven by means of the timing gears. An ignition device in housing 53 is continuously driven by shaft 26 through gears 48 and 50. By shifting the clutch collar 122 to the right as shown in Figures 7 and 8 the halves of the coupling 107 are engaged and the driven shaft 116 is rotated. When the clutch collar is in the position shown in Figures 7 and 8, the drive shaft continues to rotate, thereby driving the ignition device but not driving driven shaft 116.

When the clutch collar 122 is in the engaged position and if there is an overload on the driven shaft, then the slipping overload coupling 128 will automatically disengage until the load is reduced so that the coupling 128 can become re-engaged, which occurs automatically under the bias of spring 136.

A further modification is shown in Figure 13 wherein the simple coupling of Figure 1 is used in combination with the overload slipping coupling of Figure 7. In Figure 13, as in Figure 7, a sleeve 110 is keyed to shaft 26. One jaw 172 of a simple coupling 170 is rotatably mounted on sleeve 110. The second jaw 174 of coupling 170 is keyed to shaft 116. The overload coupling teeth 176 are provided in the face of jaw 172 that receives resiliently biased overload coupling member 114, for the purpose described above.

For the lubrication of the helical gears in chamber 40 of housing 20 there is provided an inlet passageway 44 which ports to the interior of engine housing 14. The rotation of timing gear 10 acts to throw the lubricant into the opening of inlet passageway 44. Since the timing gear 10 rotates at all times that the engine is running, there is a constant supply of lubricant being thrown into passageway 44 by timing gear 10. The inlet end of passageway 44 is spaced close to the edge of timing gear 10, so as to be better located for the purpose of receiving the lubricant thrown by the timing gear.

A slot 178 is provided in housing 20 and adjacent the bore in boss 55, in which bore is fitted portion 56 of the auxiliary housing 53. This slot 178 at one end is in communication with inlet passageway 44. The outlet end of slot 178 ports to chamber 40 in housing 20. The outlet end of slot 178 points toward the helical gear 48 so that any lubricant that passes through inlet passageway 44 and slot 178 is directed toward helical gear 48, whereby lubrication is provided for gear 48 and its meshing gear 50.

An outlet passageway 46 is provided as shown in Figures 2, 4, and 8, which passageway communicates chamber 40 to the interior of the engine housing 14. The movement of lubricant into inlet passageway 44 and through slot 178 to the chamber 40 is indicated by the flow arrows in Figures 1 and 8. The movement of the lubricant through the outlet passageway 46 from chamber 40 is indicated by the flow arrow in Figure 8.

As can be seen in Figure 4, the outlet passageway 46 is located substantially above the lowest level of chamber 40 when the housing 20 is in the position shown in Figure 4. This location of outlet passageway 46 permits the storing in chamber 40 of a quantity of lubricant, the highest level of such stored lubricant being indicated by numeral 180 in Figure 4. At this level, portions of gears 48 and 50, and bearings 30 and 34, are immersed in the lubricant, and hence these members are at all times lubricated. As the level of the lubricant in chamber 40 rises, the excess passes through outlet passageway 46 back to the interior of the engine housing.

It can be seen that I have removed the magneto, or a distributor-magneto system, and magneto drive shaft from a typical tractor engine and have substituted therefor a power take off enclosed in a housing, and a drive for a magneto or a distributor-magneto system. By providing a disengageable coupling, it is optional as to whether or not the power take off is actuated. However, whether or not the power take off is coupled up, the magneto or distributor-magneto system are continually driven as the engine operates. There is further provided an automatic overload coupling designed to disengage the power take off if the load driven thereby is excessive.

Thus, I have provided a novel power take off which is independent of existing power take offs from an engine, and which is operable at all times that the engine is running, said power take off being provided with a shiftable clutch and coupling means for optionable operation, and automatic disengageable coupling means operable upon overload of the power take off.

While there has been shown and described particular embodiments of this invention, it will be obvious to those skilled in the art that various other changes and modifications may be made therein without departing from the invention and, therefore, it is intended in the appended claims to cover all such changes and modifications as fall within the true spirit and scope of the invention.

What I claim as new and desire to secure by Letters Patent of the United States is:

1. A clutch assembly adapted to be introduced between a drive shaft and a driven shaft comprising, in combination, a first coupling means for selectively coupling or uncoupling said drive shaft with said driven shaft for transmitting power, said first coupling means including a coupling member mounted on said drive shaft and having formed thereon first and second coupling elements, said first coupling element being part of said first coupling means, torque-overload responsive means carried by said drive shaft adapted to cooperate with said second coupling element to cause said coupling member to be rotatable with said drive shaft, said coupling member being rotatable with respect to said drive shaft when said second coupling element is not cooperating with said torque-overload responsive means carried by said drive member, said second coupling element and said torque-overload responsive means carried by said drive shaft for cooperating therewith constituting a second coupling means adapted for transmitting power thereby from said drive shaft to said driven shaft for transmitting power, and said second coupling means normally being operative for transmitting power but adapted to become inoperative for transmitting power when the demand for power by said driven shaft exceeds a predetermined amount.

2. A clutch assembly adapted to be introduced between a drive shaft and a driven shaft comprising, in combination, a first coupling member rotatably mounted on said drive shaft and having formed thereon first and second coupling elements, a second coupling member carried by said driven shaft, in spaced axial relation to said first coupling elements on the drive shaft, shiftable clutching means carried by said second coupling member and being slidable thereon axially for selectively coupling said first and second coupling members, a third coupling member mounted in axially slidable relation on said drive shaft and being rotatable therewith, said third coupling member having clutching elements thereon adapted to engage and cooperate with said second coupling elements on the first coupling member, resilient means carried by said drive shaft and biasing said third coupling member into coupling engagement with said first coupling member, and said third coupling member being adapted to move axially against the bias of said resilient means to separate said third coupling member from coupling engagement with said first coupling member when the torque load on the driven shaft exceeds a given amount.

3. A clutch assembly as set forth in claim 2 including means mounted on said first and second coupling members for limiting the axial shifting of said shiftable clutching means.

4. A clutch assembly as set forth in claim 2 including ball poppet means carried by said second coupling member and being operatively associated with said shiftable clutching means for restraining said shiftable clutching means in a pair of selected positions.

References Cited in the file of this patent

UNITED STATES PATENTS

| | | |
|---|---|---|
| 1,117,427 | Neuteboom et al. | Nov. 17, 1914 |
| 1,327,504 | Wagner | Jan. 6, 1920 |
| 1,468,883 | Rosner | Sept. 25, 1923 |
| 1,569,205 | Sandin | Jan. 12, 1926 |
| 1,654,087 | Masur | Dec. 27, 1927 |
| 1,982,721 | Woolson | Dec. 4, 1934 |
| 2,102,002 | Hill | Dec. 14, 1937 |
| 2,110,321 | Borgerd et al. | Mar. 8, 1938 |
| 2,352,270 | Land et al. | June 27, 1944 |

FOREIGN PATENTS

| | | |
|---|---|---|
| 73,404 | Norway | Apr. 19, 1948 |
| 797,157 | France | Apr. 22, 1936 |